(12) United States Patent
Chennubhotla et al.

(10) Patent No.: US 6,977,948 B1
(45) Date of Patent: Dec. 20, 2005

(54) JITTER BUFFER STATE MANAGEMENT SYSTEM FOR DATA TRANSMITTED BETWEEN SYNCHRONOUS AND ASYNCHRONOUS DATA NETWORKS

(75) Inventors: Geeta Desai Chennubhotla, San Jose, CA (US); Sridhar G. Sharma Isukapalli, Fremont, CA (US)

(73) Assignee: UTStarcom, Inc., Alameda, CA (US)

( * ) Notice: Subject to any disclaimer, the term of this patent is extended or adjusted under 35 U.S.C. 154(b) by 874 days.

(21) Appl. No.: 09/929,734

(22) Filed: Aug. 13, 2001

(51) Int. Cl.$^7$ ................................................. H04J 3/06
(52) U.S. Cl. ...................................................... 370/516
(58) Field of Search ........................... 370/412–418, 370/516, 517, 519

(56) References Cited

U.S. PATENT DOCUMENTS

| | | |
|---|---|---|
| 4,156,112 A | 5/1979 | Moreland |
| 4,534,024 A | 8/1985 | Maxemchuk et al. |
| 4,771,425 A | 9/1988 | Baran et al. |
| 5,345,445 A | 9/1994 | Hiller et al. |
| 5,477,541 A | 12/1995 | White et al. |
| 5,526,353 A | 6/1996 | Henley et al. |
| 5,566,170 A | 10/1996 | Bakke et al. |
| 5,684,954 A | 11/1997 | Kaiserswerth et al. |
| 5,790,538 A | 8/1998 | Sugar |
| 5,793,978 A | 8/1998 | Fowler |
| 5,867,677 A | 2/1999 | Tsukamoto |
| 6,157,653 A | 12/2000 | Kline et al. |
| 6,208,662 B1 | 3/2001 | O'Neill et al. |
| 6,215,685 B1 | 4/2001 | Fung et al. |
| 6,243,667 B1 | 6/2001 | Kerr et al. |
| 6,311,212 B1 | 10/2001 | Chong et al. |
| 6,343,072 B1 | 1/2002 | Bechtolsheim et al. |
| 6,452,950 B1 * | 9/2002 | Ohlsson et al. ............ 370/516 |
| 6,480,499 B1 * | 11/2002 | Richards et al. ............ 370/412 |
| 2001/0030966 A1 | 10/2001 | Chol |
| 2002/0038379 A1 | 3/2002 | Sato et al. |

* cited by examiner

Primary Examiner—Huy D. Vu
Assistant Examiner—Daniel Ryman
(74) Attorney, Agent, or Firm—Felix L. Fischer

(57) ABSTRACT

A system (100) for receiving data from an asynchronous network and transmitting such data onto a synchronous network includes a voice packet buffer memory system (108) with a jitter buffer (118) having groups of entries storing data for voice channels and jitter buffer valid bit (JBVB) memory (120) for status of a particular entry for multiple jitter buffer groups. Writing or reading data from a jitter buffer entry sets a corresponding JBVB memory bit to a valid or invalid state respectively. Jitter buffer data may be read with a corresponding state memory bit. If a corresponding JBVB memory bit is valid, data from a jitter buffer (118) may be provided as an output. If a corresponding JBVB memory bit is invalid, a loss recovery algorithm may compensate for such invalid jitter buffer data.

20 Claims, 7 Drawing Sheets

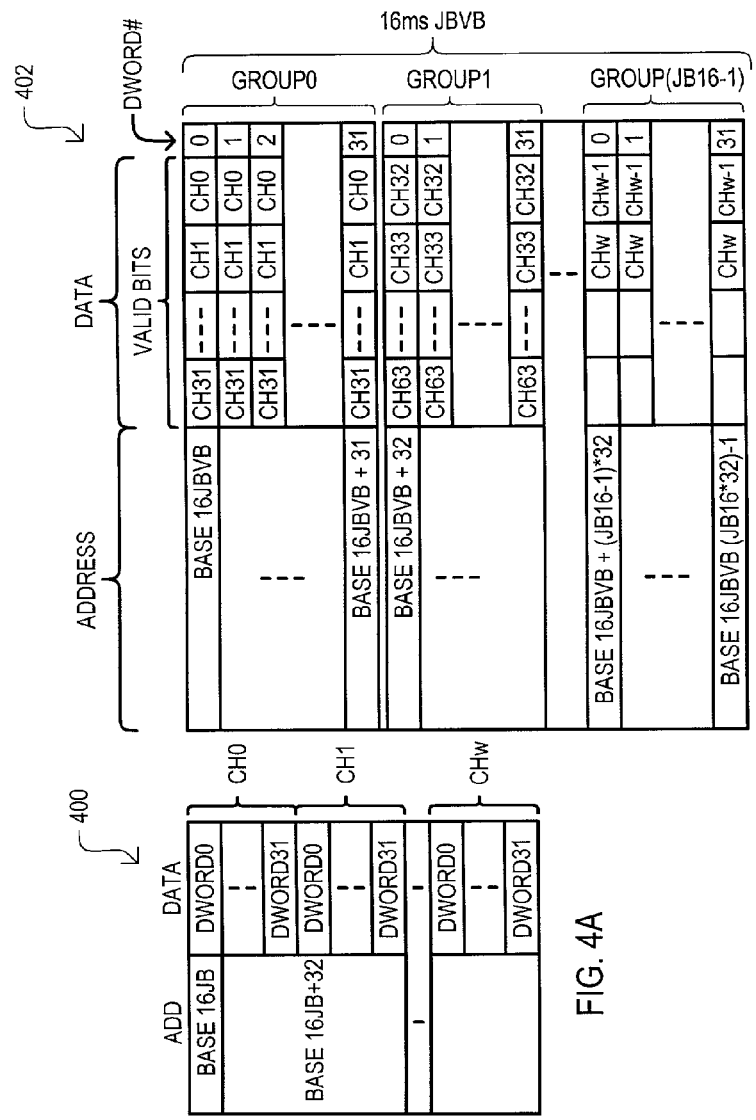
FIG. 4B
FIG. 4A
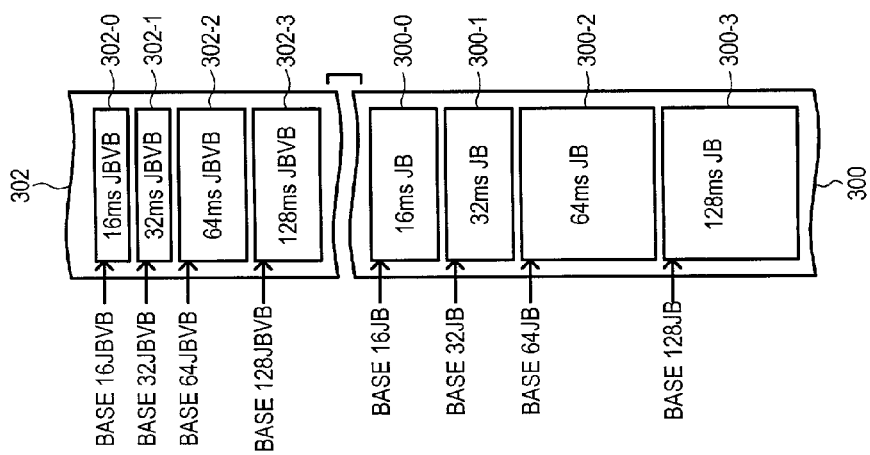
FIG. 3

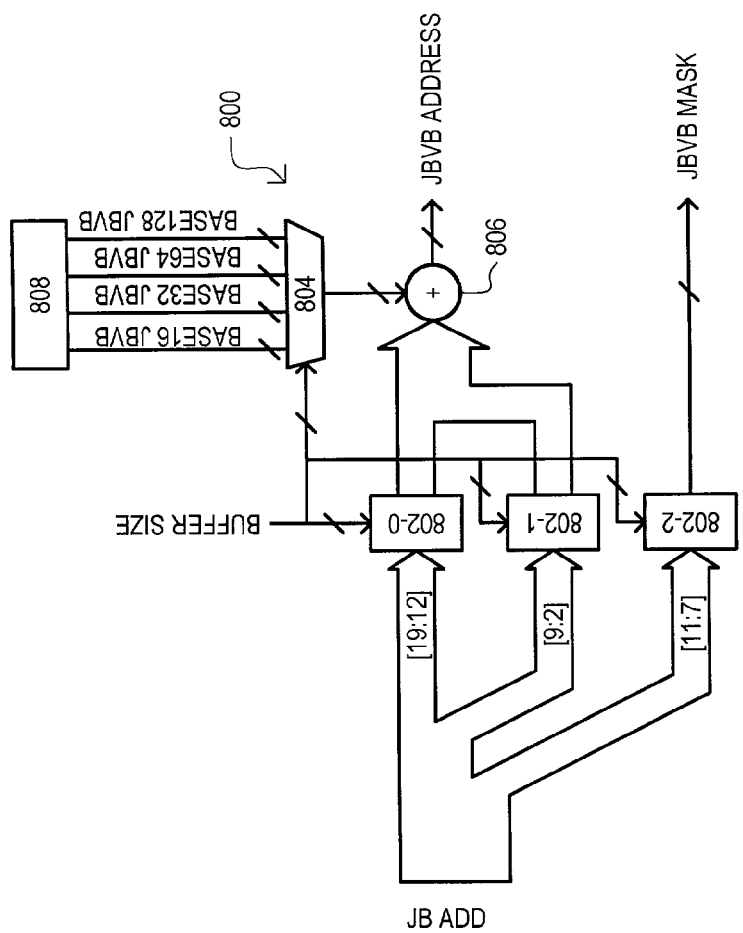

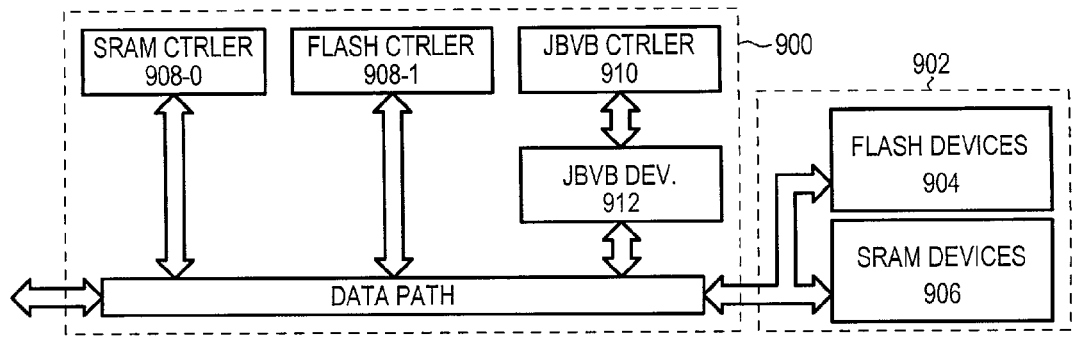
FIG. 9
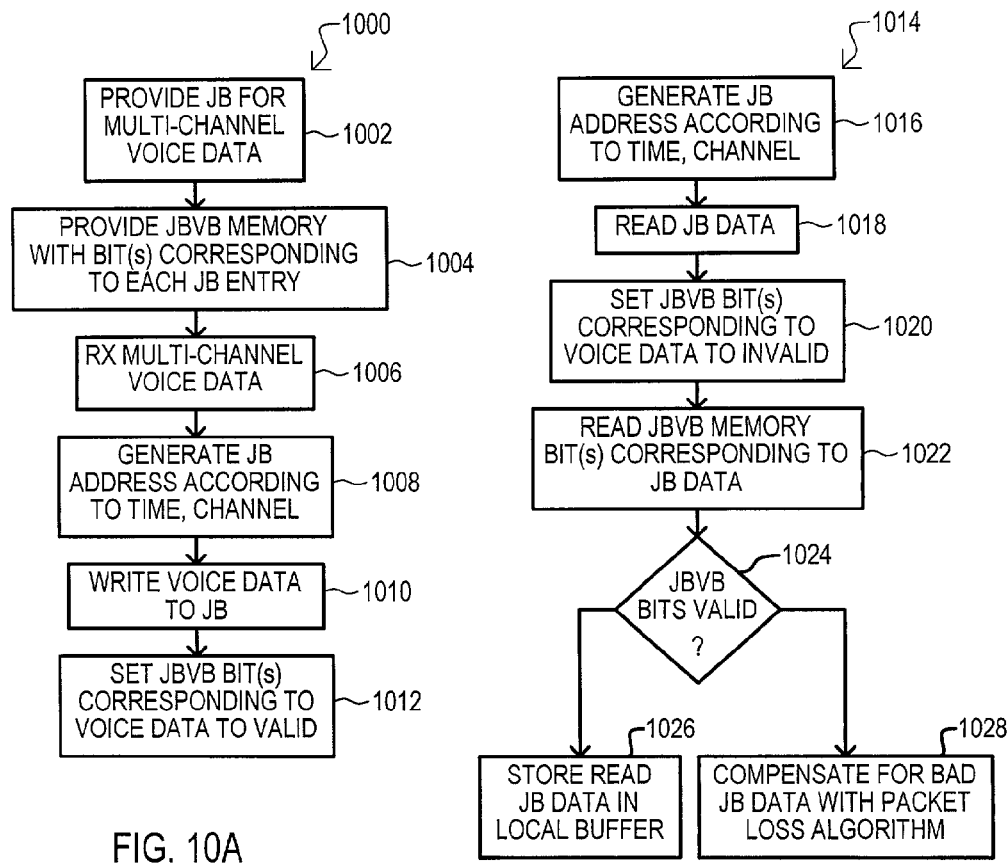
FIG. 10A
FIG. 10B

JITTER BUFFER STATE MANAGEMENT SYSTEM FOR DATA TRANSMITTED BETWEEN SYNCHRONOUS AND ASYNCHRONOUS DATA NETWORKS

TECHNICAL FIELD

The present invention relates generally to systems for processing network data, and more particularly to systems that can transfer data between an asynchronous data network, such as a TCP/IP network, and a synchronous network, such as a TDM network.

BACKGROUND OF THE INVENTION

Data communication networks may be generalized into at least two types: asynchronous and synchronous. Provided such networks remain independent, performance characteristics and transmission latencies are understood, and in many cases predictable. However, in light of the convergence of disparate networks, there arises a need to provide methods and systems for interconnecting asynchronous networks with synchronous networks. Asynchronous networks typically operate under well known protocols, including by not limited to, the Transmission Control Protocol (TCP), Internet Protocol (IP), User Datagram Protocol (UDP) to name but a few. A well known synchronous network approach includes time division multiplexing (TDM), which can allocate particular data channels to predetermined time slots.

One very particular application for interconnecting asynchronous and synchronous systems includes voice data. Conventional voice data examples will now be described.

Conventionally, voice data remains separate from network data traffic. In particular, many enterprises may have a data network connecting a variety of workstations as well as a public branch exchange (PBX) for voice data. As data networks proliferate, it is becoming an increasingly desirable goal to integrate transmission of voice and data onto a converged network "backbone."

Transmitting data over a synchronous network, such as a time division multiplex (TDM) voice system can be inefficient, as such systems typically transmit voice and data in predetermined frames. Frames are allocated portions of bandwidth, usually formed according to a time division multiplexing scheme. In the event voice or data traffic drops, a frame may be transmitted with only voice or data, thus wasting available bandwidth.

Transmitting voice over a data network (voice over network) can provide advantages over other approaches. Voice over network can take advantage of existing network structures. Further, as noted above, networks (including the Internet) continue to grow in size and in bandwidth. Voice over network can be more efficient than data over voice as such systems are typically packet based. In a packet based system, bandwidth is used as needed. When data is transmitted, a data packet can be sent through the network. When voice is needed, a voice packet can be transmitted through the network.

Voice over networks can provide additional cost savings as voice may be transmitted between locations without incurring conventional toll charges. This can be particularly true for systems that transmit voice over the Internet.

Many networks can be "connectionless" networks. Connectionless networks can provide multiple possible paths between source and destination. Consequently, in some cases, voice transmitted over such networks may be more reliable as voice data can reach a destination even if some of the network nodes are not operational. One type of voice of network approach utilizes the Internet protocol (IP), and is often referred to as voice-over-IP (VoIP).

Data networks may take a variety of forms. As noted above, a data network may be a connectionless network, including the Internet. Further, a network may include portions that are overlaid and/or integrate connection-oriented legs. Such systems include Internet protocol (IP) over asynchronous transfer mode (ATM), IP switching systems, and multiprotocol label switching (MPLS), or similar switching systems.

One possible drawback to transmitting voice data over connectionless networks, or networks having connectionless portions, can be the potential for different portions of the same voice stream arriving out of sequence. For example, a stream of voice data is typically broken down into samples and transmitted in a particular sequence over a network. However, while such samples can be transmitted in order, because packets may travel along different legs of a network, a sample may arrive out of order. Still further, it is possible for packets to be dropped. Thus, a voice sample may never arrive at a desired destination.

In contrast to many non-voice applications, in voice over network arrangements, voice data needs to reassembled in the same order that it was transmitted with minimal latency. This can be difficult to achieve with many conventional approaches.

Various proposals for implementing voice over data networks have been proposed. One general approach is the idea of a network "gateway." A network gateway can provide access to a network (such as the Internet) for a variety of conventional voice data sources (voice channels). As but one example, a network gateway can be an IP gateway that integrates a PBX with an IP network. In such an arrangement, users may make telephone calls that appear entirely conventional, but are in fact being transmitted over a data network.

One drawback associated with voice over data networks can be the latency introduced by such approaches. Various sources may contribute to latency. A transmitting source introduces some delay in placing the voice into packet form. Typically the voice data can be digitized and/or compressed and then placed in packet form. Transmission of the voice over a data network can also introduce latency. Routing from node to node, or along a switching path, can consume additional time. Finally, a receiving destination can introduce delay. Voice data can be extracted from a packet and then transmitted along an appropriate voice channel. Such packet processing can be conventionally accomplished with a general purpose processor.

According to one conventional approach, a network voice packet can be forwarded to a destination according to conventional protocols, such as the Real-time Transport Protocol (RTP). A destination can include conventional network hardware, such as a network interface card, which can receive the packet. A general purpose processor can then extract voice data within the packet (including any decoding/decompressing) and then play the voice data over sound card, or the like. Such computation steps can contribute significantly to latency.

According to another conventional approach, a network can include a network phone (such as an "IP Phone"). A network phone can have its own network address, and include packet processing and voice data processing hardware.

One conventional way to decrease latency is with more complex routers. In particular, some routers may be capable of giving particular packets precedence over others. As but one example, some packet headers can include a "type of service" or "quality of service" field. A network voice packet can be given higher precedence than other packets, thereby reducing latency when compared to other packets. A drawback to such approaches is that all routers/switches in the network must have such an advanced processing capability, and thus can be expensive to implement. Consequently, such an approach may be better suited for enterprise wide area networks (WANs), instead of a larger network structure such as the Internet.

Another approach can essentially reserve a route for a voice packet flow. One such approach is the Resource ReserVation Protocol (RSVP). RSVP, like the precedence approach noted above, can rely on more complex routers and thus be an expensive solution.

While the approaches described above can reduce latency for voice packet data, such approaches may be difficult and/or expensive to implement. Further, it is still desirable to reduce latency even more. Thus, further ways of decreasing latency in network voice packets could a valuable contribution to voice over data networking.

While conventional packet forwarding of voice a data network may provide adequate results, this may not always be the case. To help improve the processing of time dependent data, including voice data, a number of protocols have been proposed. One such protocol is the Real-Time Transport Protocol (RTP). An RTP header can provide sequence and timestamp information than may help assemble voice data once it has been received.

Another concern that may arise out of voice over network systems is different possible voice data formats. Some formats may require different processing than others. Further, the processing of one voice format type may take longer and/or require more resources than other voice formats. Different voice formats may include, as but two of the many possible examples, "multiplexed" voice packets, which can contain voice data from multiple sources, and "simplex" voice packets, which may contain voice data form a single source. With the advent of multiplexed and simplex voice packets, systems may have to be capable of accommodating both types of voice packets.

Multiplexed voice data can present a challenge to voice-over-network systems. In particular, it can be a complex task to extract multiple voice samples from different voice streams, and then arrangement such samples for playback.

Voice over networks systems are typically "asynchronous" in that voice data samples may arrive at varying time intervals and/or in varying order. This is in contrast to conventional "synchronous" voice systems, such as TDM systems, that reserve time slots for particular voice channels. An important issue arriving out of systems that seek to transfer voice data from an asynchronous system to a synchronous system can be variable network delay in voice data arriving from an asynchronous system (jitter).

Of course, it is understood that voice data represent but one of the many applications for interconnecting asynchronous and synchronous systems. A system for accounting for network jitter could have various other applications that transmit data from an asynchronous network to a synchronous network. Such alternative applications include, but are not limited to other non-voice data applications, including but not limited to video data and various other computing applications.

In light of the above, it would be desirable to arrive at a system that can receive data from an asynchronous network, and store such data for synchronous access by a synchronous network. Such a system could address various drawbacks to conventional approaches, and could be particularly valuable in voice over network applications.

SUMMARY OF THE INVENTION

According to one embodiment of the present invention, a network data processing system may include a jitter buffer and corresponding state buffer. A jitter buffer may include groups of jitter buffer entries that each store data for a different data channel. A state buffer may include entries having a number of bits. Each bit of a state buffer entry can show the status (valid or invalid) of one particular jitter buffer entry. For example, one state buffer entry (which could be 32-bits) could store the status for the first entry in each of the jitter buffer groups. A system may also include an address generator or address translator that can "swizzle" a jitter buffer entry address to generate the address of the valid buffer entry containing the valid bit for the jitter buffer entry.

According to one aspect of the embodiments, an address generator can swizzle a first portion of a jitter buffer address to generate a corresponding state buffer address, and generate a bit mask from a second portion of the jitter buffer address to mask out all other bits except the status bit corresponding to the jitter buffer entry.

According to another aspect of the embodiments, an address generator can add a jitter buffer base address to a swizzled jitter buffer address to generate a corresponding state buffer address.

According to another aspect of the embodiments, a jitter buffer and state buffer may be stored in separately accessible memory devices.

According to another aspect of the embodiments, a jitter buffer may be formed in a static random access memory.

According to another aspect of the embodiments, a system may include multiple jitter buffers of different sizes. For example, one jitter buffer can store a certain amount of data for its data channels (e.g. 16 ms of voice data, for a voice data application), while another jitter buffer can store a different amount of data for its data channels (e.g. 32 ms of voice data, for voice data applications). Such varying jitter buffer sizes can be used to address a worst case jitter for a given connection.

According to another aspect of the embodiments, a system may further include an access engine for providing data from a jitter buffer. An access engine can read jitter buffer entry data along with corresponding state buffer data. If state buffer data is invalid, the corresponding jitter buffer can output previously stored voice data for the same channel.

According to another aspect of the embodiments, a system may further include an access engine that includes a local buffer, a multiplexer, and a replicator. A local buffer may store previous data for a data channel. A replicator may replicate previously stored data. A multiplexer can output either current data or replicated previously stored data according to state buffer data.

BRIEF DESCRIPTION OF THE DRAWINGS

FIG. 3 is a block diagram of a jitter buffer and corresponding JBVB according to another embodiment.

FIGS. 4A and 4B are detailed block diagrams of a jitter buffer and corresponding JBVB according to an embodiment.

FIG. 7 is table illustrating jitter buffer address "swizzling" for generating a JBVB address.

FIG. 8 is a block diagram of an address swizzler according to an embodiment.

FIG. 9 is a block diagram of a memory control unit according to an embodiment.

FIGS. 10A and 10B are flow diagrams of a method according to one embodiment.

DETAILED DESCRIPTION OF THE EMBODIMENTS

Various embodiments of the present invention will now be described with reference to a number of drawings. The various embodiments may include one or more buffers (e.g., jitter buffers) that can store data from multiple data channels, as well as a corresponding valid data memory (e.g., a jitter buffer state valid bit (JBVB) memory) that can provide a rapid and/or convenient indication of the state of buffered voice data for the multiple voice channels.

Figure 1:
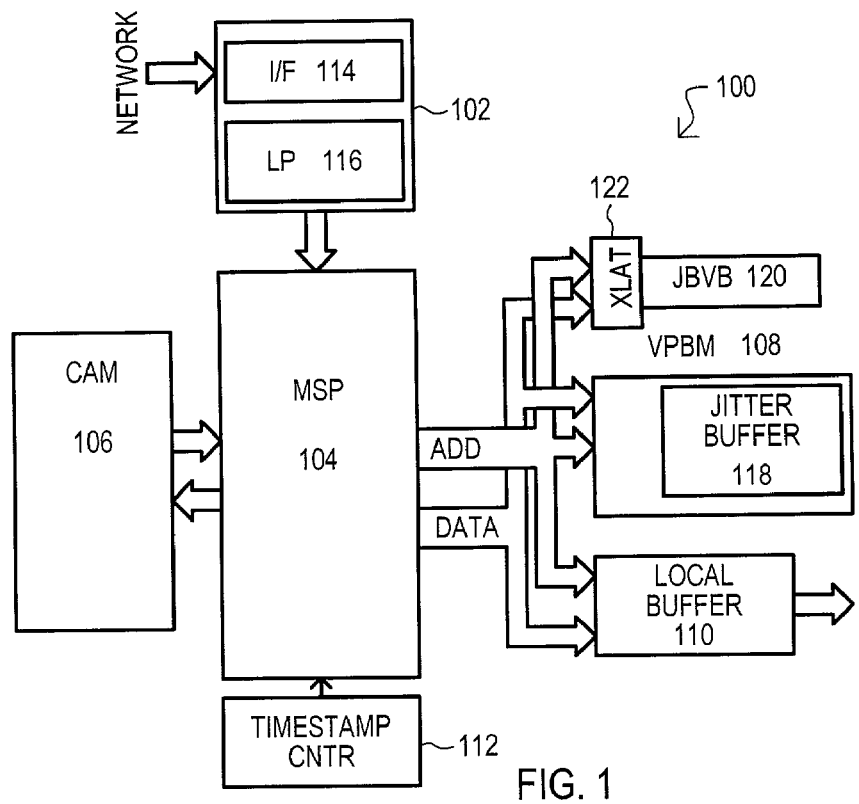
FIG. 1 is a block diagram of one embodiment.

The following describes one particular application for a jitter buffer according to the present invention. The examples shown illustrate a voice over network application. Of course, it is understood that alternate embodiments may process non-voice data, or a combination of voice and non-voice data. Referring now to FIG. 1, a network voice data processing system is set forth in a block diagram and designated by the general reference character 100. A system 100 may include a receive (RX) subsystem 102, a multistream processor (MSP) 104, a content addressable memory (CAM) subsystem 106, a voice packet buffer memory (VPBM) system 108, and a local buffer 110. In addition, a timestamp counter 112 can provide count values corresponding to voice data to a MSP 104.

One mode of operation for a system 100 will now be described in general. A RX subsystem 102 may receive voice data from multiple voice channels from an asynchronous network. Such voice data may be in packet form, and thus include various header layers corresponding to particular protocols. A RX subsystem 102 may include an interface 114 for buffering incoming packet data. A layer processor 116 can extract header or other information from a packet, and then store such information in a register or the like. An MSP 104 may process such information and then forward voice channel data (e.g., a payload) for storage in a VPBM system 108. It is noted that a RX subsystem 102 may receive simplex voice data packets that each carry voice data for a different voice channel and/or multiplexed voice data packets that may each include voice data for multiple voice channels.

A MSP 104 can be a processor that may generate various addresses for writing data to and/or reading data from a VPBM system 108. In one particular approach, a MSP 104 can extract header and other information for generating an address for storing the voice data. As but one example, header and/or other packet information may be used as input values for indexing an address in a CAM subsystem 106. In this way, voice data associated with a particular location may be stored at a predetermined location within a VPBM system 108.

To ensure appropriate sequencing of voice channel data, a timestamp counter 112 may be included that may operate in conjunction with timestamp information in a voice data packet to generate a VPBM system 108 address for particular voice data. Alternatively, a sequence number may be used to ensure proper sequencing of voice channel data.

As shown in FIG. 1, a VPBM system 108 may include a jitter buffer 118. A jitter buffer 118 may store voice data for subsequent readout via a local buffer 110. Buffering voice data in a jitter buffer 118 may allow for smoother reading (e.g., for playback) of voice data from multiple channels for transmission on a synchronous network, such as a time division multiplexed (TDM) network.

A system 100 may also include a JBVB (or state) memory 120 that can maintain the state of the data stored in a jitter buffer 118 to indicate if data corresponding to a current voice channel is valid. In one particular approach, a JBVB memory 120 may store one or more bits for every segment (e.g., byte, word, double word (dword), or double dword) of data stored for a particular channel. In the event data read from a jitter buffer 118 is not valid, a system 100 may compensate for such invalid data.

The particular VPBM system 108 of FIG. 1 is shown to further include an address translator 122. An address translator 122 may translate a jitter buffer memory 118 address into a JBVB memory address 120. In this way, as voice channel data is read/written, bits within a JBVB memory can be updated to reflect such changes.

Figure 2:
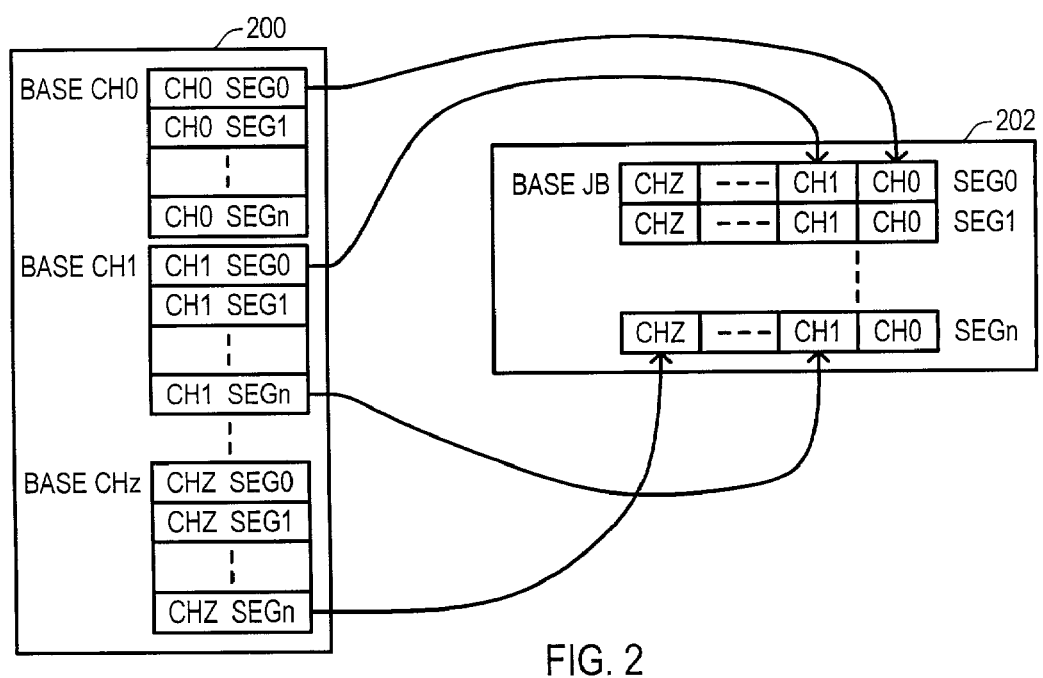
FIG. 2 is a block diagram of a jitter buffer and corresponding jitter buffer valid buffer (JBVB) according to one embodiment.

Having described a particular system 100 that includes a VPBM 108, one approach to forming a jitter buffer and JBVB memory will now be described with reference to FIG. 2. FIG. 2 shows one example of a jitter buffer 200 and a corresponding JBVB memory 202. A jitter buffer 200 may include a number of storage locations, each of which can store a data segment for a particular voice channel. While a data "segment" may take various forms, in a preferred embodiment a data segment may be a 32-bit double-word.

In the arrangement of FIG. 2, data for a given channel are stored in order. Thus, a jitter buffer 200 shows that up to "n" segments of voice data for channel 0 (CH0) can be stored in consecutive locations (entries). CH0 data may be followed by CH1 data, which may be followed by other channels. In the example of FIG. 1, up to "n" data segments for a last channel data (CHz) may also be stored. Addresses for various locations in a jitter buffer 200 are also shown in FIG. 2. Thus, CH0 data may begin at a base address BASE CH0.

It is noted that a jitter buffer 200 may be a "circular" buffer, with each segment representing a subsequent voice data sample for a given channel. Writes to a jitter buffer can be conceptualized as "random access," as data is written as it arrives over an essentially "asynchronous" data network. A time stamp value may be used to determine which particular entry voice data will be written to.

In contrast to jitter buffer write operations, jitter buffer read operations may be "ordered" as jitter buffer entries are read according to sequentially increasing time stamp values. For example, if it is assumed that a jitter buffer includes 32 entries for each voice channel, when the last 5 bits of a time stamp value are "00000," a first entry for each group may be read (e.g., CH0 SEG0, CH1 SEG0 . . . ) assuming such channels are active (currently in use). On a subsequent jitter buffer read operation, the last 5-bits of a time stamp value may be "00001." In this case, a second entry for each group may be read (e.g., CH0 SEG1, CH1 SEG1.), again, assuming that such channels are active.

A JBVB memory 202 may have storage locations that correspond to particular data segments of multiple channels. In this way, the reading of one storage location in a JBVB memory 202 can indicate the status of a particular data segment for multiple voice channels. In FIG. 2, each status bit is indicated by a channel indicator. Thus, the "CH0" bit corresponding to the segment 0 (SEG0) entry can represent the status of the first data segment of channel 0. A base address for JBVB memory 202 is shown in FIG. 2 as BASE JB. Thus, by reading the entry stored at address BASE JB, that status of the first data segment of channels 0 to Z can be determined.

In this way, a read from a single JBVB memory 202 location may advantageously indicate the state of a particular data segment for multiple voice channels. Such an operation can reduce latency in the processing of voice data as such read operations can amortize accesses across multiple channels.

Reads from a JBVB memory 202 may generally follow those of a jitter buffer. Namely, reads may occur with respect to a sequential time stamp values. For example, if it is assumed that a jitter buffer includes 32 entries for each voice channel, when the last 5 bits of a time stamp value are "00000," a first entry for a JBVB memory may be read, which can give status information for a first segment (SEG0) for "Z" channels. On a subsequent JBVB memory read operation, the last 5-bits of a time stamp value may be "00001." In this case, a second entry may be read, which can give status information for a second segment (SEG1) for "Z" channels.

While FIG. 2 shows one particular example of a jitter buffer and corresponding JBVB memory, a system may include a jitter buffers having different sized portions and/or multiple jitter buffers of different sizes. One particular example of such a case is shown in FIG. 3.

FIG. 3 shows multiple jitter buffers 300-0 to 300-3 and corresponding JBVB memories 302-0 to 302-3. Jitter buffers 300-0 to 300-3 may be different address spaces of the same memory device/system and/or portions of different memory devices.

In the particular example of FIG. 3, jitter buffers (300-0 to 300-3) can exist in the same address space, and are preferably memory locations on the same semiconductor storage device, or on multiple such devices coupled to a common memory controller. Further, each jitter buffer (300-0 to 300-3) can buffer different amounts of data, with jitter buffer 300-0 storing up to 16 milliseconds (ms) of voice data for multiple voice channels, jitter buffer 300-1 storing up to 32 ms of voice data for multiple voice channels, jitter buffer 300-2 storing up to 64 ms of voice data for multiple voice channels, and jitter buffer 300-3 storing up to 128 ms of voice data for multiple voice channels. As noted previously, a jitter buffer size (16 ms, 32 ms, 64 ms, or 128 ms) can represent a maximum expected jitter for a voice channel.

In FIG. 3, each jitter buffer (300-0 to 300-3) may be accessed beginning at a base address. Base addresses for jitter buffers 300-0 to 300-3, are shown as BASE 16JB, BASE 32JB, BASE 64JB, and BASE 128JB, respectively. One advantageous feature can be to include programmable registers for establishing base addresses for various different sized jitter buffers. In this way, a jitter buffer memory size may be optimized for varying transmission delays of voice data.

Referring again to FIG. 3, JBVB memories 302-0 to 302-3 may correspond to jitter buffers 300-0 to 300-3, respectively. A JBVB memory (302-0 to 302-3) may be formed from storage locations in the same device(s) as a jitter buffer. However, a JBVB memory (302-0 to 302-3) may preferably be independent from a jitter buffer, to allow simultaneous, or essentially simultaneous access to a jitter buffer (300-0 to 300-3) and JBVB memory (302-0 to 302-3). In this way, a JBVB memory (302-0 to 302-3), which represents the state of data in a corresponding jitter buffer (300-0 to 300-3), may be revised at essentially the same time data is written to/read from a jitter buffer (300-0 to 300-3).

While JBVB memories (302-0 to 302-3) may be formed from a device that is independently accessible with respect to jitter buffers (300-0 to 300-3), JBVB memories (302-0 to 302-3) may be formed in a common address space. By example, base addresses for various JBVB memories 302-0 to 302-3 in FIG. 3 are shown as BASE 16JBVB, BASE 32JBVB, BASE 64JBVB, and BASE 128JBVB, respectively. As will be described in more detail herein, the same address that accesses data in a jitter buffer (300-0 to 300-3) may be used to access corresponding bit(s) in a JBVB memory (302-0 to 302-3) by "swizzling" the jitter buffer address. Such an arrangement, may improve the speed at which a JBVB memory (302-0 to 302-3) may be updated as a corresponding jitter buffer memory (300-0 to 300-3) is accessed.

In this way a jitter buffer can buffer voice data for incoming packets. More particularly, voice data arriving in an asynchronous fashion may be buffered. As will be described in more detail below, such buffering may allow buffered voice data to be played out at a constant rate.

It is noted that a jitter buffer can address the problem of voice packets that may arrive out of order. As will be described at a later point herein, a jitter buffer address may be generated according to a timestamp count value or sequence number. Thus, an out of order voice packet may be stored in a jitter buffer in a proper chronological order with respect to other voice packets of the same channel.

It is also noted that a JBVB memory can address the problem of voice packets that are missed. For example, a connection may lose a voice packet. A JBVB memory can be accessed to rapidly determine if particular voice data is missing. In addition, missing voice data may be compensated for by various conventional loss recovery algorithms.

In order to further describe various aspects of the various embodiments, more detailed examples of jitter buffers and corresponding JBVB memories will now be described.

Referring to FIG. 4A one example of a jitter buffer 400 is shown. A jitter buffer 400 may store up to 16 ms of voice data for multiple channels. In the particular example of FIG. 4A, a 32-bit double word (dword) may correspond to approximately 0.5 ms of voice data. Thus, it is assumed that voice has been sampled at 8 kHz, with 8 bits per sample. Consequently, in order to allow for up to 16 ms of voice data, a jitter buffer 400 may include 32 entries (DWORD0 to DWORD31) for each voice channel. FIG. 4A show a case of "w" channels (CH0 to CHw). Further, a base address for jitter buffer 400 is shown as BASE 16JB.

Referring now to FIG. 4B, a JBVB memory 402 corresponding to jitter buffer 400 of FIG. 4A is shown in some detail. A JBVB memory 402 may arrange the various channels of a corresponding jitter buffer into groups. Further, each group can provide the status of a predetermined number of data segments (in this case dwords). In the example of FIG. 4B, each group includes 32 channels and provides a status bit for 32 data words for each channel. In particular, a GROUP0 can include 32 entries, each of which reflects that status of dwords DWORD0 to DWORD31 for channels CH0 to CH31. Similarly, a GROUP1 can include 32 entries, each of which reflects that status of dwords DWORD0 to DWORD31 for channels CH32 to CH63. A last group GROUP(JB16-1) stores information for the last two channels CHw-1 and CHw.

The example of FIG. 4B includes 32 channels for each group because a 32-bit wide addressable space is particularly convenient for processor accesses. Of course, a JBVB memory may group channels in other ways. As but a few of the many possible examples, a data segment read from a JBVB memory to determine a channel data status could be smaller or larger than a power of two, and as small as for one channel. That is, one JBVB memory bit may correspond to a portion of a jitter buffer entry, or multiple such jitter buffer entries.

Further, a data segment read from a JBVB may include non-status data that could be masked when the data segment is read. Accordingly, the various examples set forth herein should not necessarily be construed as limiting the invention thereto.

JBVB memory addresses for the various groups are also shown in FIG. 4B. In particular, an address BASE 16JBVB can index to a first dword of GROUP0, while an address BASE 16JBVB+32 can index to a first dword of GROUP 1.

In this way, the reading of a single dword can provide status information for a given dword in multiple channels of a group. By way of example, referring to FIGS. 4A and 4B, data words for multiple channels may be read out periodically in a "round robin" fashion. A first dword DWORD0 for channel CH0 may be read from a jitter buffer 400 at address BASE 16 JB. This may be followed by reading DWORD0 for channel CH1 from jitter buffer 400 at address BASE 16JB+32. This may provide a first 0.5 ms of sound for channel CH0 and CH1. However, at the same time, a corresponding JBVB memory 402 entry may be read at JBVB address BASE 16JBVM. This access can provide a rapid indication of whether the data read from a jitter buffer are valid. In particular, the CH0 and CH1 bits can read. If such bits are valid (have a predetermined value), the data read from a jitter buffer can be stored in an outgoing buffer. However, if a JBVB memory bit is not valid, data provided to a buffer may be altered to compensate for the missing, "old" or corrupt data read from a jitter buffer.

Figure 5B:
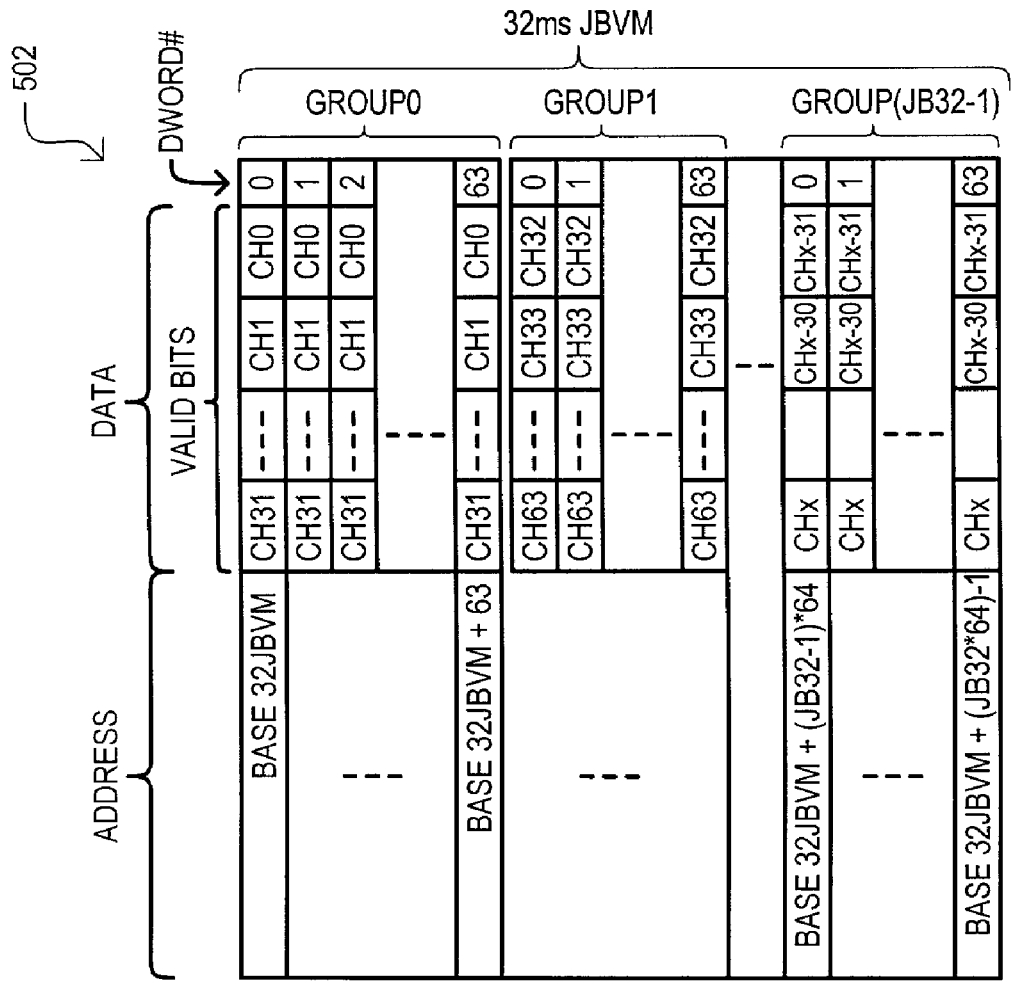
FIGS. 5A and 5B are detailed block diagrams of a jitter buffer and corresponding JBVB according to an embodiment.
Figure 5A:
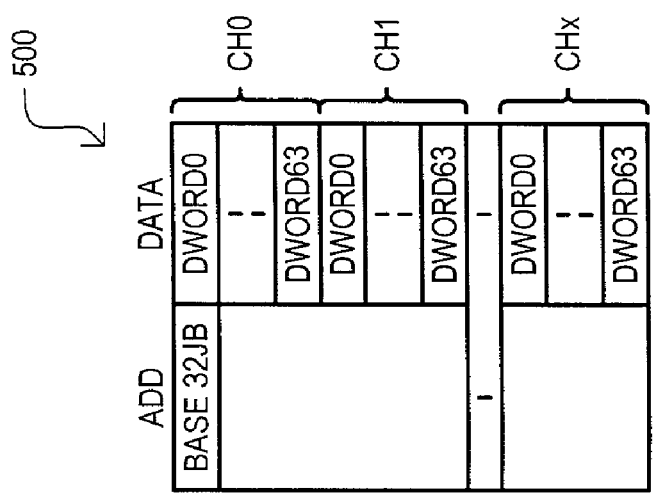

Referring to FIG. 5A another example of a jitter buffer 500 is shown. A jitter buffer 500 may store up to 32 ms of voice data for multiple channels. Like FIG. 4A, in the particular example of FIG. 5A, a 32-bit double word (dword) may correspond to 0.5 ms of voice data. Consequently, a jitter buffer 500 may include 64 entries (DWORD0 to DWORD63) for each voice channel. FIG. 5A shows a case of "x" channels (CH0 to CHx). Further, a base address for jitter buffer 500 is shown as BASE 32JB.

Referring now to FIG. 5B, a JBVB memory 502 corresponding to jitter buffer 500 of FIG. 5A is shown in some detail. FIG. 5B corresponds to FIG. 5A in the same essential way that FIG. 4B corresponds to FIG. 4A. In particular, a JBVB memory 502 arranges channels into groups of 32. Such an arrangement may be advantages when various JBVB memories (i.e., 16 ms, 32 ms, 64 ms, 128 ms etc.) are stored in the same, or same type of memory device.

It is noted that one skilled in the art would understand that larger jitter buffers/JBVB memories, such as a 64 would naturally follow from the above teachings.

It is also noted that the various examples have illustrated JBVB memories that can include one bit that corresponds to a 32-bit dword jitter buffer entry. Of course, alternate relationships may be implemented according the various embodiments. As but a first example, a JBVB memory may include bits that correspond to portions of a stored jitter buffer entry (e.g., 1 JBVB memory bit corresponds to 16 or 8 bits of a dword). Similarly, a JBVB memory may include bits that correspond to multiple jitter buffer entries. An example of this latter case is illustrated in FIGS. 6A and 6B.

Figure 6B:
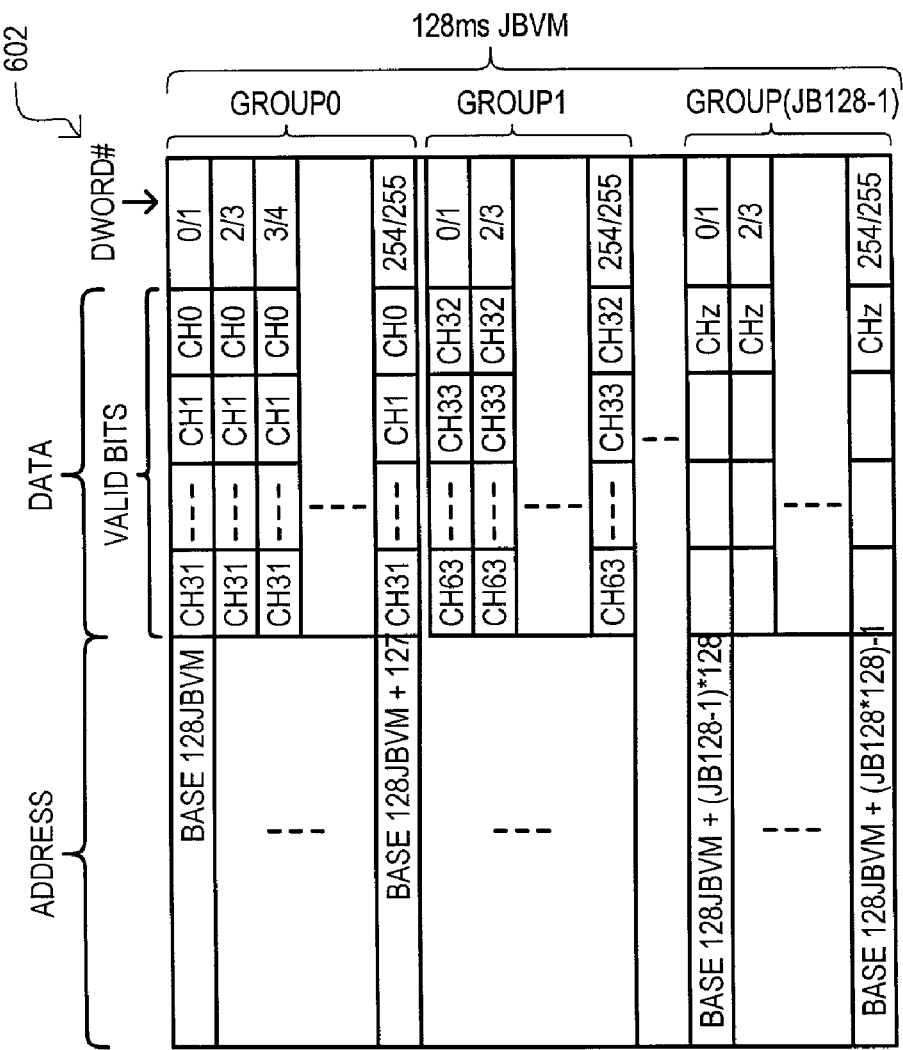
FIGS. 6A and 6B are detailed block diagrams of a jitter buffer and corresponding JBVB according to an embodiment.
Figure 6A:
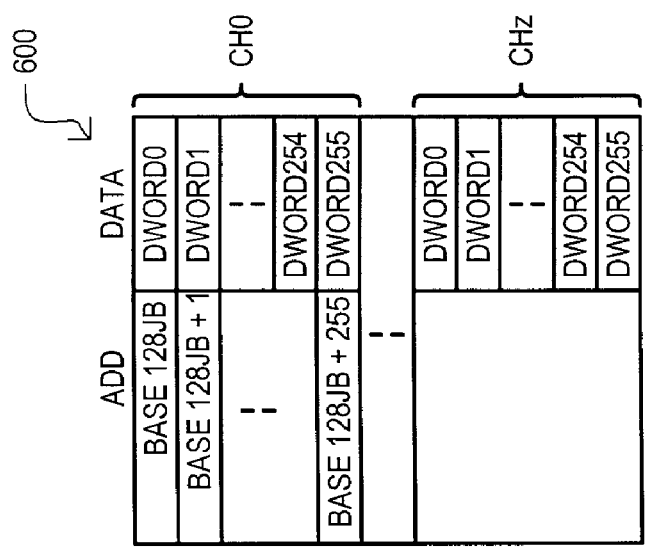

Referring to FIG. 6A one example of a jitter buffer 600 is shown. A jitter buffer 600 may store up to 128 ms of voice data for multiple channels. As in the case of the previous examples, it will be assumed that a 32-bit double word (dword) corresponds to approximately 0.5 ms of voice data. Consequently, a jitter buffer 600 may include 256 entries (DWORD0 to DWORD255) for each voice channel. FIG. 6A show a case of "z" channels (CH0 to CHz). A base address for jitter buffer 600 is shown as BASE 128JB.

Referring now to FIG. 6B, like the previous examples, a JBVB memory 602 may arrange the various channels of a corresponding jitter buffer into groups. Again, because it may be convenient when multiple JBVB memories are stored in the same memory device, each group can includes 32 channels. However, unlike the previous examples, and as illustrated in FIG. 6B, each JBVB memory entry may provide the status for two dwords of a jitter buffer. Thus, each group of JBVB memory 602 can include 128 entries that correspond to the 256 dwords for given voice channels.

In this way, a relationship between JBVB memory bits and corresponding jitter buffer data segments may not be a one-to-one relationship. Preferably, in the case where a JBVB memory contains the state for "n" 32-bit doublewords (dwords), a minimum sample size may be N/2 ms.

As previously noted, an address for a JBVB memory may be generated from an address that accesses a jitter buffer. One approach can "swizzle" a jitter buffer address. Swizzling an address may include rearranging and/or performing one or more operations on a source address to generate a result address. One very particular approach to swizzling a jitter buffer address to generate a JBVB memory address is shown in FIG. 7. The particular example of FIG. 7 may correspond to the example shown in FIGS. 3 to 5B.

FIG. 7 shows a table that illustrates how a JBVB memory address may be generated. A column "BUFFER SIZE" indicates how the generation of a JBVB memory address can vary according to which particular jitter buffer is accessed. Four possible jitter buffers are shown in FIG. 7: a 16 ms, 32 ms, 64 ms, and 128 ms buffer. In the case of a 16 ms buffer access, a corresponding JBVB memory may include multiple portions of a jitter buffer address (bits [16:12] and bits[6:2]). This value can be added to a base address for a 16 ms JBVB memory (BASE 16JBVB). Finally, as will be recalled, in the particular jitter buffer address arrangement of FIG. 4A, each channel could have a particular dword selectable from among 32 dwords. A jitter buffer address could include bits [11:7] for selecting a particular dword. These same bits can be utilized to generate a bit mask for data read from a JBVB memory entry. The generation of bit masks is well understood in the art, and so will not be described in detail herein.

The remaining JBVB memory address generation approaches for the 32, 64 and 128 ms JBVB memories can be understood from the remaining rows of FIG. 7. That is, one or more portion of a jitter buffer address, along with a JBVB memory base address offset, may be used to access a JBVB memory entry. Different portions of the jitter buffer address may then be used to generate a bit mask for accessing a desired bit (or bits) containing data on an accessed JBVB data segment.

While the various steps described above to "swizzle" a jitter buffer address to generate a corresponding JBVB memory (and bit mask) can be performed by a general purpose processor according to stored instructions, to increase processing speed, an hence reduce latency, it may be desirable to include hardware to perform such steps.

One example of hardware that may generate a JBVB memory address from a jitter buffer address is shown in FIG. 8 as 800. In the particular example of FIG. 8, addresses are generated according to the example of FIG. 7. Bits from a various portions of a jitter buffer address (JB ADD) may be selected by selecting circuits 802-0 to 802-2. Looked at in another way, selecting circuits (802-0 to 802-2) may separate out various portion of a jitter buffer address that may then be used to generate a JBVB valid buffer address. For example, a selecting circuit 802-1 may provide bits [16:12] in the event a BUFFER SIZE value indicates a 16 ms jitter buffer is being accessed, or bits [18:14] in the event a 64 ms buffer is being accessed.

In a similar fashion, hardware 800 may include a multiplexer 804 that can provide a particular base address (BASE 16JBVB, BASE 32JBVB, BASE 64JBVB and BASE 128JBVB) according to a BUFFER SIZE value. In the particular example of FIG. 8, a base address may be added to a "swizzled" jitter buffer address values in an adder 806. The output of an adder 806 may be a JBVB memory address. Base addresses may be stored in base address registers 808. Of course, other embodiments may use alternate approaches to accessing base addresses. As but one example, a BUFFER SIZE value could index a look-up table, or the like, that may store base addresses.

Of course, the particular hardware example of FIG. 8 represents but one implementation. One or more of the various functions represented in FIG. 8 may be performed by a custom or general purpose processor executing a series of predetermined instructions.

All or a portions of hardware such as that shown in FIG. 8 could be formed as one portion of a MSP, such as that shown in FIG. 1. In addition or alternatively, all or portions of such hardware may be formed in a JBVB controller, as will be described in more detail below.

Referring now to FIG. 9, a block diagram is set forth illustrating a memory control unit 900 and memory devices 902 according to one embodiment. An arrangement such as that shown in FIG. 9 can represent physical portions of a system such as that shown in FIG. 1. FIG. 9 includes a memory control unit 900 may be controlled by a MSP, such as that shown as item 104 in FIG. 1, to access various memory devices 902. In the particular example of FIG. 9, memory devices 902 include nonvolatile memory devices 904 (for example, "flash" electrically erasable and programmable read-only memories (EEPROMs)), as well as volatile memory devices 906. Preferably, a volatile memory device may include a fast (i.e., rapidly accessible) memory device, such as a static random access memory (SRAM). Of course, various other types of volatile memories could be used, including synchronous dynamic RAMs (SDRAMs).

In one preferred embodiment, a nonvolatile memory device 904 may store "boot" information for configuring an MSP. A volatile memory device 906 may include portions that serve as one or more jitter buffers for storing voice data for multiple voice channels. Of course, a volatile memory device 906 may also store instructions for a MSP and other information that may be needed for a system such as that shown as 100 in FIG. 1.

A memory control unit 900 may include external memory controllers 908-0 and 908-1. In the example of FIG. 9, externally memory controller 908-0 may access volatile memory devices 906, while external memory controller 908-1 may access nonvolatile memory devices 904. As is well understood, a memory controller 908-0/1 can generate address and control values necessary for accessing various memory locations.

Unlike many conventional approaches, a memory control unit 900 may further include a JBVB memory controller 910 and corresponding JBVB device 912. A JBVB memory controller 910 may generate address and control signals for accessing a JBVB device 912. At least a portion of a JBVB device 912 may function as a JBVB memory, previously described, and store one or more bits that can represent the state of multiple channel voice data segments stored in a jitter buffer.

As previously noted, when data are written to a jitter buffer, corresponding bit(s) within a JBVB memory may be set to "valid" states. Conversely, when data are read from a jitter buffer, corresponding JBVB memory bits may be set to invalid states. A JBVB controller 910 may include hardware for "swizzling" a jitter buffer address, and thereby rapidly accessing corresponding JBVB memory data.

Having described various embodiments of jitter buffers and corresponding JBVB memories, a method for storing and monitoring data from multiple voice channels will now be described.

FIG. 10A shows a method for writing data to a buffer memory that is designated by the general reference character 1000. A method 1000 may include providing a jitter buffer for storing voice data from multiple channels (step 1002). Such a step, in one particular arrangement, may include providing one or more storage devices having multiple addressable locations. A method 1000 may also include providing a JBVB memory having bits locations that each correspond to each jitter buffer entry (step 1004). In one particular embodiment, this may include providing a separate storage devices having entries that may be addressed in conjunction with, or preferably essentially simultaneous to, accesses to a jitter buffer.

Multi-channel voice data may then be received (step 1006). A step 1006 can include receiving voice data that is to be played back as different voice channels. In one particular arrangement, such a step may include buffering voice packet data received in packet form. Even more particularly, voice data may be in simplex and multiplexed form.

Once data from multiple voice channels has been received, a jitter buffer address for given voice data can be generated based on channel identifying information and a time value (step 1008). A step 1008 may include examining one or more header information fields to determine a channel identification value for a given portion of voice data. In addition, a timestamp counter, such as that shown as 112, can generate a time count value for received voice data. Such channel identification and time count values may be used to generate a jitter buffer address.

According to addresses generated according to a step 1008, voice channel data may be written to a jitter buffer (1010).

A method 1000 may also include setting JBVB memory bits corresponding to jitter buffer locations (1012). A step 1012 may include generating write operation to a JBVB memory whenever a write to a jitter buffer occurs. As noted previously, in particular embodiments, a step may include using jitter buffer address (e.g., swizzling) to generate a JBVB memory address. Still further, a step 1012 may be essentially simultaneous to a step 1010.

Having described steps involved in storing data in a jitter buffer, steps for reading data from jitter buffer will now be described with reference to FIG. 10B.

FIG. 10B shows a method for reading stored voice channel data from a buffer that is designated by the general reference character 1014. A method 1014 may include generating a jitter buffer address according to a channel value and particular time value (step 1016).

Voice channel data may then be read according to such an address (step 1018). In one particular arrangement, voice data for a channel may be read in a periodic fashion. Even more particularly, an interrupt may be generated at regular intervals to initiate a reading of voice channel data. The period of such interrupts may be essentially equivalent to the duration of a sample accessed in a single read operation. For example, if a read operation can access 32-bits of voice data, and 32-bits corresponds to 0.5 ms of voice data, an interrupt could be generated every 0.5 ms.

A method 1014 may also include setting JBVB memory bits corresponding to jitter buffer data that has been read (1020). A step 1020 may include generating a write operation to a JBVB memory whenever a read from a jitter buffer occurs. As noted previously, in particular embodiments, a step may include using jitter buffer address (e.g., swizzling) to generate a JBVB memory address. Still further, like steps 1010 and 1012, a step 1018 may be essentially simultaneous to a step 1020. It is noted that when a jitter buffer entry is read, a corresponding JBVB memory bit can be reset.

A method 1014 includes additional steps that may utilize JBVB data in a readout operation of jitter buffer data. In particular, when jitter buffer data is read, corresponding JBVB memory bits may also be read (step 1022). Such read JBVB memory data could then determine how corresponding jitter buffer data may be processed.

As represented by FIG. 10B, JBVB memory bits can be examined to determine if they are valid or invalid (step 1024). In the event JBVB bits are valid, data read from a jitter buffer can be stored in a local buffer (step 1026). However, in the event JBVB bits are invalid, a loss recovery algorithm may be used to compensate for such "bad" jitter buffer data (step 1028).

One particular loss recovery mechanism may include "playing" back data that has been previously stored for a given channel. How much data is played back can vary according to approach.

Having described methods for writing data to, and reading data from a jitter buffer, a detailed approach to processing read jitter buffer data will now be described.

Figure 11A:
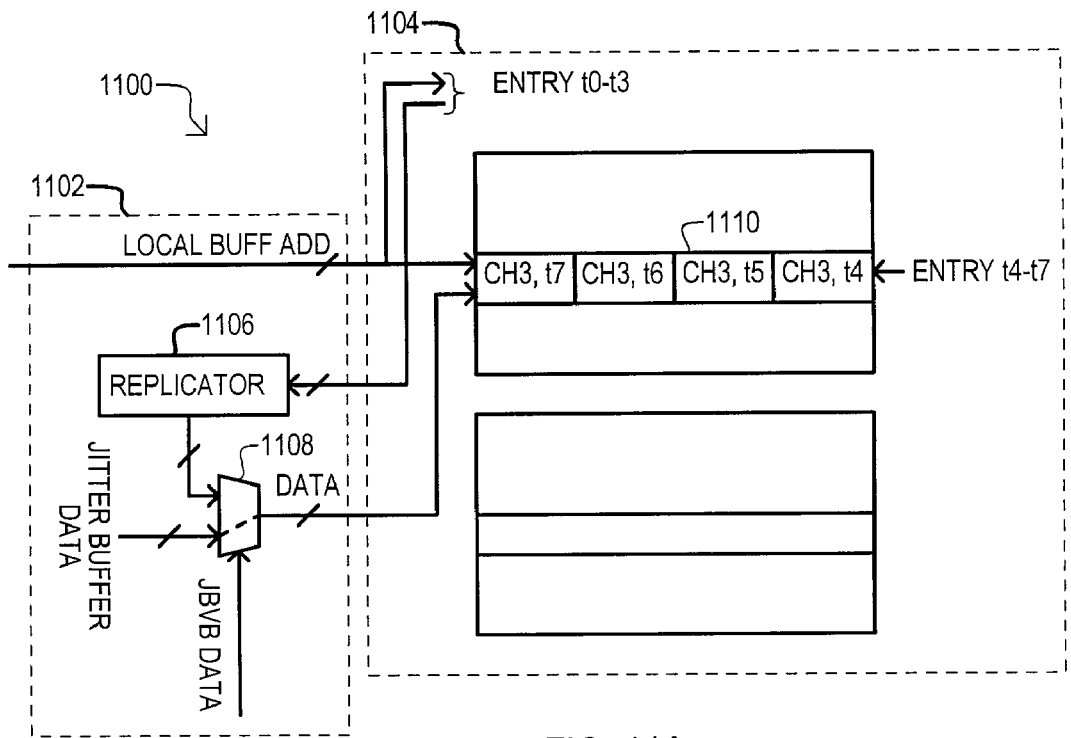
FIGS. 11A and 11B are block diagrams showing the operation of an access engine according to an embodiment.
Figure 11B:
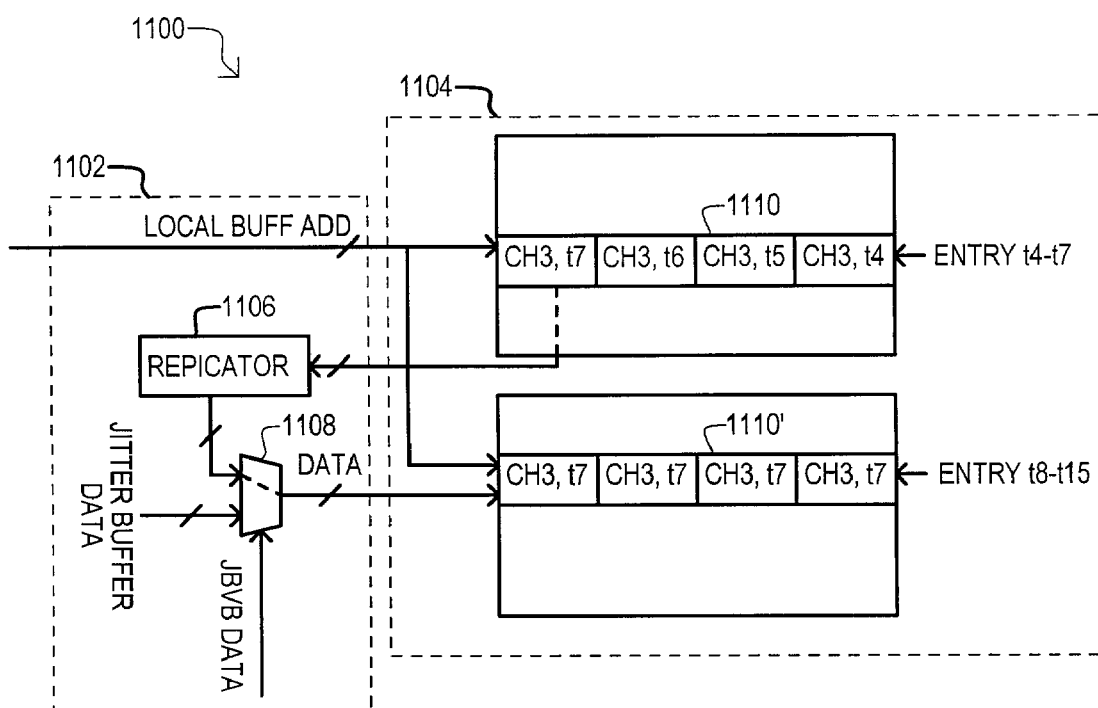

Referring now to FIGS. 11A and 11B, a device for processing read jitter buffer data is designated by the general reference character 1100, and may include an access engine 1102 and a local buffer 1104. A local buffer 1104 may include a number of storage locations, each accessible by a local buffer address. A local buffer 1104 may store voice channel data for current readout, and in addition, may also store voice channel data from a previous readout.

An access engine 1102 can provide addresses and corresponding data to a local buffer 1104. An access engine 1102 may receive a local buffer address (LOCAL BUFF ADD), jitter buffer data, and corresponding JBVB data. In addition, an access engine may include replicator 1106 and multiplexer 1108. A replicator 1106 can replicate previously stored voice channel data. A multiplexer 1108 can receive replicated (previously stored) data from a replicator 1106 and currently read jitter buffer data as inputs. A multiplexer 1108 may be controlled by JBVB data. Thus, how an access engine 1102 functions can depend upon whether JBVB data is valid or invalid.

FIG. 11A shows an operation where JBVB data is valid. A local buffer address (LOCAL BUFF ADD) corresponding to a particular voice channel can be generated. Such an address may access a "current" local buffer location 1110. In addition, the same address can be used to access a previous valid sample (not shown). In the particular example of FIG. 11A, a current buffer location 1110 can correspond to a voice channel 3 (CH3) and times t4–t7. In one very particular example, a buffer location 1110 may store 32-bits of 0.5 ms voice data, with 8-bit portions each corresponding to 125 µs.

At the same time a local buffer address is received, jitter buffer data and corresponding JBVB data may also be received. Because corresponding JBVB data is valid, a multiplexer 1108 can output current jitter buffer data for storage in entry 1110. Thus, entry 1110 is shown in FIG. 11A to store CH3 data for times t4–t7.

It is noted that the same local buffer address that accesses entry 1110 may also access CH3 data from a previous time period (t0–t3). Such data can be supplied to a replicator 1106. However, because JBVB data is valid, the output of a replicator 1106 is not provided as an output from a multiplexer 1108.

FIG. 11B shows a subsequent read for CH3 from a jitter buffer to a local buffer 1104. However, unlike the case of FIG. 11A, corresponding JBVB data is invalid. In the example of FIG. 11B, entry 1110 may now be considered a "previous" local buffer entry, while entry 1110' is now a current local buffer entry. A local buffer address accesses both entries (1110 and 1110'). However, because JBVB data is not valid, jitter buffer data is not output by a multiplexer 1108. Instead, multiplexer 1108 can provide data from a replicator 1106 as an output.

As previously noted, a replicator 1106 may receive data from a previous entry. Preferably, a replicator 1106 receives previous voice data for the same voice channel. In the particular example of FIG. 11B, a replicator 1106 can replicate the last portion of a previous entry. Thus, in FIG. 11B a portion of a previous entry (CH3, t7) has been repeated four times and provided as an input to a multiplexer 1108. This data can then be stored in entry 1110' as "current" voice data for the time period t8–t11. In this way, previous voice data may be replicated to replace voice invalid voice data in a voice stream.

While the above example has described the case where a portion of a sample is replicated for loss recovery, alternate approaches may be used. In particular, rather than replicate a portion of a sample, an entire previous "good" sample may be played back. For example, in the above type of local buffer arrangement, a last "good" entire 0.5 ms sample may be played back.

Still further, loss recovery approaches may be capable of looking back in a jitter buffer history and playout the last "good packet". The data contained in the last packet can span multiple 0.5 ms intervals. Also, on packet loss multiple jitter locations can be invalid. To support packet replication error recovery, a method can subtract from a current jitter buffer offset a value corresponding to n*sample size where n represents the number of packets lost. In such a case, a memory can maintain the sample size corresponding to each channel as well the number of continuous samples that are missing to derive a number of number of packets that were lost. This information can be used to index into the correct jitter buffer location.

Replication and/or retrieval of previous voice data may not be the only approach for loss recovery. According to the present invention, jitter buffer data may be interpolated to recover lost data. More particularly, for lost data, a system may again retrieve a last known "good" sample. A lookahead method may then be used to find a next good sample in a jitter buffer. This will obviously work only when the playout delay is large enough and the jitter buffer size is large enough to accommodate samples from the past, present and future. Lost data may be generated by interpolating between the last known good sample and future "good" sample. Of course, if a new good sample from the past or future is not available then another loss recovery mechanism may be employed.

While various approaches to compensating for loss of voice data have been described, still other alternative algorithms may be used. One of the many possible approaches is shown in Series G, Appendix I of the standard G.711 promulgated by the International Telecommunication Union, titled "A High Quality Low-Complexity Algorithm for Packet Loss Concealment with G.711," dated September 1999. More particularly, the presence of a JBVB memory bit that indicates "bad" voice data can indicate a bad frame.

The various particular examples described herein have shown a case where an entire jitter buffer entry (e.g., 32-bit dword) may be copied to a local buffer. Such an example can represent the case where a 32-bit dword contains 0.5 ms of voice data. However, there may be cases where only a portion of a jitter buffer entry may be copied to a local buffer at a time. In such a case, a corresponding JBVB memory bit would not be reset until all of an entry is copied. A few particular examples will now be described.

According to one variation, a 32-bit jitter buffer entry may store 1 ms of voice data, while a local buffer "plays out" 0.5 ms of voice data at a time. In such a case, a first portion (a first 16-bits) could be read from a jitter buffer and written to a local buffer. Subsequently, a second portion (a second 16-bits) could be read from the same jitter buffer entry and written to a local buffer. It is only after a second portion has been written that a corresponding JBVB memory bit is reset.

Similarly, in another variation, a 32-bit jitter buffer entry may store 2 ms of voice data, while a local buffer "plays out" 0.5 ms of voice data at a time. In such a case, a first portion (a first 8-bits) could be read from a jitter buffer and written to a local buffer. Subsequently, a second, and then a third, and then a fourth portion (each 8-bits) could also be read from the same jitter buffer entry and written to a local buffer. It is only after a fourth portion has been written that a corresponding JBVB memory bit is reset.

Of course, as has been stressed above, while voice over network may be a particularly valuable application of the present invention, the present invention should not necessarily be limited to such an application. A jitter buffer according to the various embodiments could be employed to buffer various other types of data received from an asynchronous network for transmission on a synchronous network. As but one very limited examples, a jitter buffer according to the present invention may serve in an IP to TDM bridge, providing the various reliability and latency reduction advantages described above in the limited voice application example.

Thus, it is understood that while various embodiments have been described in detail, the present invention could be subject various changes, substitutions, and alterations without departing from the spirit and scope of the invention. Accordingly, the present invention is intended to be limited only as defined by the appended claims.

What is claimed is:

1. A system, comprising:
at least a first jitter buffer store having a plurality of first jitter buffer entries arranged into groups that each store data for a particular data channel, the first jitter buffer entries being accessible by first jitter buffer addresses;
at least a first valid bit store having a plurality of valid buffer entries, each valid buffer entry having a plurality of bit locations that indicate the status of at least one entry from multiple groups of the first jitter buffer, the valid buffer entries being accessible by valid bit store addresses; and
an address generator that receives at least a first portion of first jitter buffer addresses to generate corresponding valid bit store addresses.

2. The system of claim 1, wherein:
the address generator generates bit mask values for valid bit store entries from at least a second portion of the first jitter buffer addresses.

3. The system of claim 1, wherein:
the address generator adds a valid bit store base address to the at least first portion of first jitter buffer addresses.

4. The system of claim 1, further including:
the at least first jitter buffer store is formed in a first memory device; and
the at least first valid bit store is formed in a second memory device.

5. The system of claim 4, wherein:
the first memory device comprises a static random access memory (SRAM).

6. The system of claim 1, wherein:
the at least first jitter buffer store includes a plurality of jitter buffer stores, each jitter buffer store including entry groups of different sizes.

7. The system of claim 6, wherein:
the plurality of jitter buffer stores includes the first jitter buffer store having entry groups that store X amount of data of a data channel, a second jitter buffer store having entry groups that store at least 2× amount of data of a data channel.

8. The system of claim 1, further including:
a time stamp counter that provides a time stamp value that is incremented; and
jitter buffer entries for data channels are periodically read from the at least first jitter buffer according to the time stamp value.

9. The system of claim 1, further including:
a processor that reads at least a portion of the data from first jitter buffer entries and writes the at least portion of the data to a local buffer, the processor resetting the value of at least one bit in a corresponding valid buffer entry when all of a first jitter buffer entry is written to the local buffer.

10. The system of claim 9, wherein:
each first jitter buffer entry includes N portions, and the processor reads each entry N times before resetting the value of the bit in the corresponding valid buffer entry.

11. A system for storing data from multiple channels received from an asynchronous network and outputting such data to a synchronous network, comprising:
a jitter buffer arranged into a plurality of jitter buffer groups that each include M entries, where M is a real number, each jitter buffer group storing data for a different data channel;

a valid buffer having a plurality of valid buffer entry groups, each valid buffer entry including status bits corresponding to at least one of the M entries in N different jitter buffer groups; and an address translator that translates a jitter buffer entry address for a jitter buffer entry into the valid buffer entry address having the status bit for that entry.

12. The system of claim 11, wherein:

each jitter buffer group comprises M consecutive addressable entries of a semiconductor memory device.

13. The system of claim 12, wherein:

the jitter buffer and valid buffer are formed in two different memory devices.

14. The system of claim 12, wherein:

each valid buffer entry corresponds to one particular entry in each of the N jitter buffer entry groups.

15. The system of claim 12, wherein:

the address translator includes a base address store that stores a base address for the jitter buffer, a separator for separating a jitter buffer address into at least a first portion and a second portion, and an adder for adding the base address and the first portion of the jitter buffer address.

16. The system of claim 15, wherein:

one status bit in a valid buffer entry is selectable by masking the valid buffer entry according to the second portion of the jitter buffer address.

17. A method for receiving data from an asynchronous network and outputting such data to a synchronous network, comprising the steps of:

providing a jitter buffer having a plurality of entries for storing data;

providing a valid memory having a plurality of entries for storing status bits for each jitter buffer entry;

receiving data for multiple channels;

storing data segments for each channel in a corresponding group of jitter buffer entries;

setting a status bit in the valid memory entry to a valid state when data is written to the corresponding jitter buffer entry, swizzling the write address to generate the corresponding jitter buffer entry;

reading data from jitter buffer entry; and setting the status bit of a valid buffer entry to an invalid state when data is read from the corresponding jitter buffer entry, swizzling the read address to generate the corresponding jitter buffer entry.

18. The system of claim 17, wherein:

receiving data includes receiving data packets having multiplexed data.

19. The system of claim 17, wherein:

reading data segments includes reading data segments from a jitter buffer read address that includes at least a portion of a time stamp value that increments.

20. The system of claim 17, wherein:

storing data segments includes writing data segments to a jitter buffer write address that includes at least a portion of a time stamp value that increments.

\* \* \* \* \*